Dec. 16, 1969   M. W. VERPLANKE   3,483,928
MACHINE FOR LIFTING BEETS OR LIKE TUBEROUS PLANTS
Filed Sept. 15, 1966   2 Sheets-Sheet 2
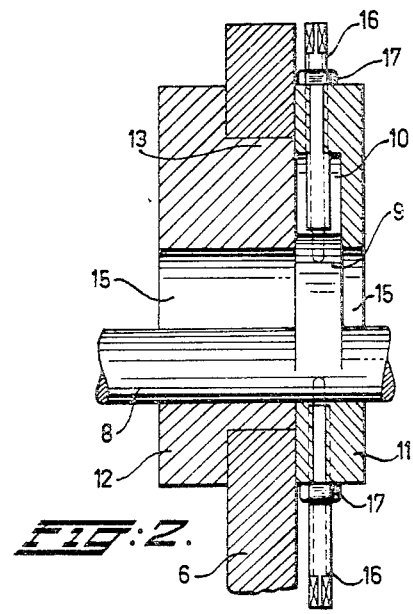
FIG:2.
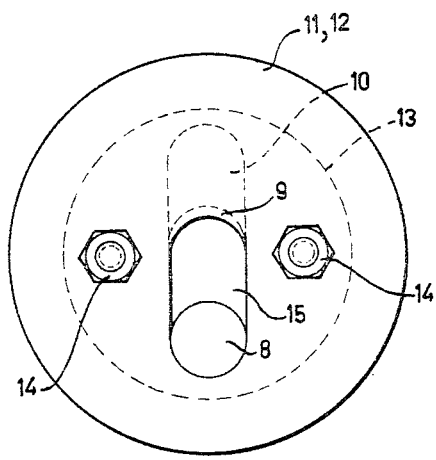
FIG:3.

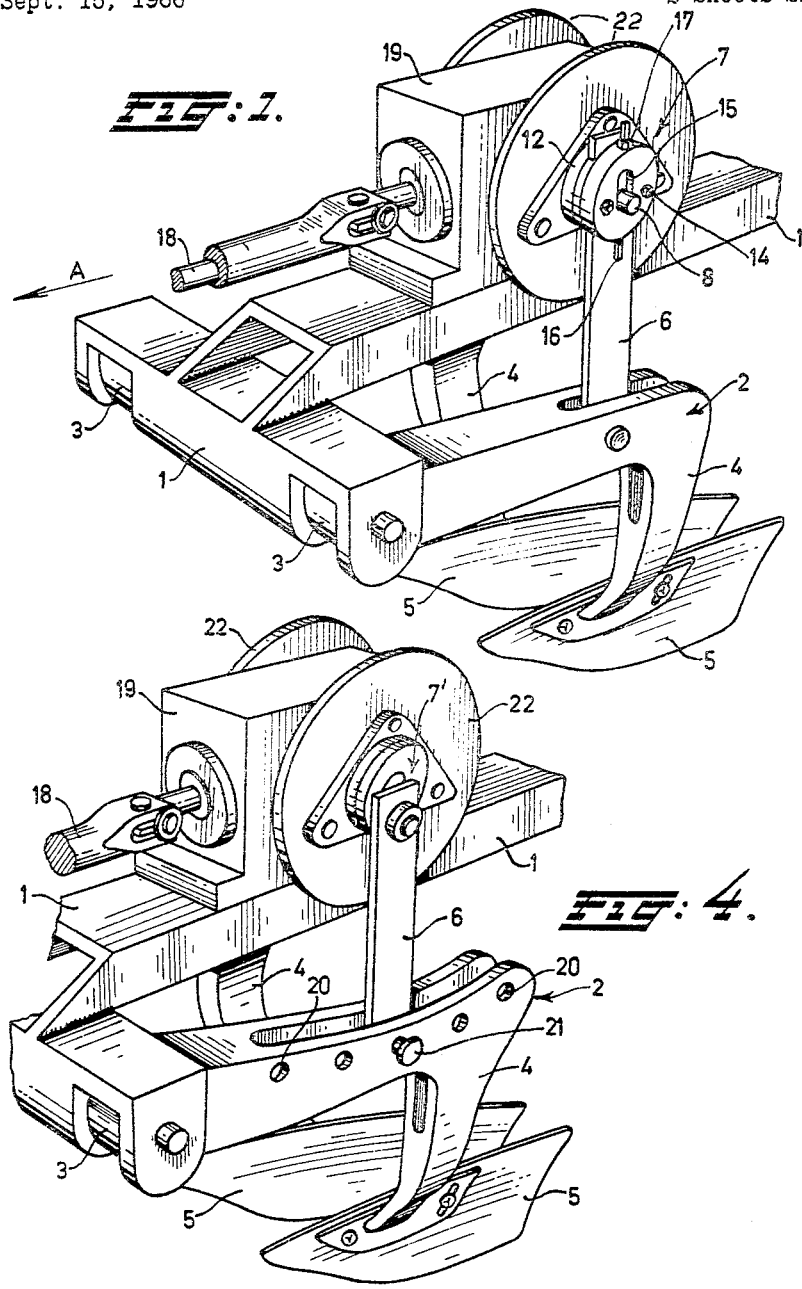

United States Patent Office 3,483,928
Patented Dec. 16, 1969

3,483,928
MACHINE FOR LIFTING BEETS OR LIKE
TUBEROUS PLANTS
Mattheus Willem Verplanke, Zacharias Polder C 10,
Ijzendijke, Netherlands
Filed Sept. 15, 1966, Ser. No. 579,677
Int. Cl. A01d 25/04
U.S. Cl. 171—99          3 Claims

ABSTRACT OF THE DISCLOSURE

A machine for lifting beets or like tuberous plants comprising a frame adapted for connection with a power take-off shaft of a supporting vehicle and having a lifting device provided with two legs each of which in the proximity of one end thereof is pivoted to a driving mechanism through the intermediary of a hinged intermediate link and at its other end is directly pivotally connected with the frame, a lifting blade being secured to each leg in the vicinity of the driving mechanism such that the blades can be reciprocated with respect to the ground by the associated driving mechanisms at a definite amplitude and at a difference of phase as compared with the other lifting blade, means being provided in each driving mechanism in order to modify the amplitude of the blade.

---

The invention relates to a machine for lifting or digging up beets or like tuberous plants (a beet harvester) comprising a frame with a lifting device provided with at least two legs which in the proximity of their one end are each pivoted to a driving mechanism and at their other end are pivotally connected with the frame, a hinged intermediate link being disposed in one of these connections, a lifting blade being secured to each leg in the vicinity of the driving mechanism, which blade with respect to the ground can be mainly vertically reciprocated by the associated driving mechanism at a definite amplitude in a considerable difference of phase as compared with a juxtaposed lifting blade.

Such a machine is known in which a motion is imparted to two pin shaped lifting members while the driving mechanism is constructed as a crank shaft. This motion consisting of a horizontal and a vertical component should ensure that the beets are lifted or dug up from the ground in the most undamaged and clean conditions.

In practice it appears that in use of this known machine various difficulties are experienced. The movement of the lifting blade (like among other things speed, length of stroke and direction of movement) is not always adapted to the prevailing circumstances, that is to say to the condition of the soil, the weather conditions and the kind of beet. Furthermore the hinged intermediate link in the known machine is mounted at a great distance from the driving mechanism, so that a horizontal component of movement of the lifting members is inevitable which on increasing the driving speed and vibratory velocity can give rise to such a contact with the beet that the latter breaks instead of being lifted. It should be noted in this connection that as a consequence of the application of heavy duty agricultural machines and owing to the use of fertilizer the ground becomes harder so that there is more difficulty in working it. Furthermore the farmer desires a beet harvester of great capacity which needs no additional manual labor.

It is an object of the invention to overcome the aforementioned difficulties in that a beet harvester is provided which is capable of being related to all kinds of beets, weather conditions and the condition of the ground as indicated hereinbefore.

It is a further object of the invention to impart practically any desired motion to the lifting blades, not only in relation to the stroke length but also to the frequency.

Another object of the invention is to provide a machine in which the frequency of the reciprocating movement can be increased without the production of an undesired horizontal component in the movement of the lifting blades, as is the case in the known machine.

The foregoing and other objects and advantages of the invention will appear in the description to follow.

In the description reference is made to the accompanying drawing, which form a part hereof, and in which there is shown by way of illustration and not of limitation a specific form in which the invention may be embodied.

In the drawing:

FIG. 1 is a perspective view of the frame with a lifting device, the wheels not being shown.

FIG. 2 is a longitudinal section of an embodiment of the adjustable eccentric.

FIG. 3 is a plan view of the eccentric according to FIG. 2.

FIG. 4 shows a different embodiment of the beet harvester.

The best harvester according to the invention consists of a tractor (not shown) with a direction of travel indicated by arrow A and a trailing frame 1 (the wheels of which are not represented) containing two legs 2 of which one end 3 is pivoted at the front end of the frame. Upon the other end 4 of each leg 2 is secured an adjustable lifting blade 5 which for the purpose of interchanging and sharpening can be dismounted. The lifting blade is free at its leading and trailing ends. In the proximity of the end 4 of each leg 2 a loose intermediate link or crank rod 6 is pivotally connected. The upper end of this link 6 is rotatably mounted on an eccentric 7 (represented in FIG. 2 in a position of maximum amplitude). This eccentric together with a shaft 8 constitutes the driving mechanism for the associated leg 2 and lifting blade 5.

As shown in FIGS. 2 and 3, a protrusion 9 is formed perpendicular to the driving shaft 8 at the location of the eccentric 7.

This protrusion 9 fits slidably in a slot 10 of one half 11 of the eccentric 7. The other eccentric half 12 comprising a bearing part 13 with a smaller diameter, is secured to the eccentric half 11 by means of two or more bolts 14. The link or crank rod 6 is pivotally supported upon part 13. A slot 15 is provided in both eccentric halves 11, 12 so as to allow for the readjustment of the eccentric 7 in the transverse direction with respect to the driving shaft 8 protruding through the slot 15. The readjustment is effected by means of set bolts 16 cooperating with either the driving shaft 8 or the protrusion 9. The bolts are locked in their definite position by means of nuts 17. In this manner the amplitude of the eccentric can be accurately adjusted. The working depth of the blades 5 can be determined or readjusted by means of the connection of the frame 1 with the tractor. The power take off from the tractor is coupled with shaft 18 leading to a gearing within the casing 19.

Each suitable eccentric can be used, while the entire frame 1 can also be drawn the other way round, thus in a direction of travel as opposed to A, by a coupling device provided at the other end of the frame, e.g. a three point hitch directly coupled to the hindmost lifting beam of the tractor. In this condition, the lifting blades 5 should be oppositely mounted.

The embodiment according to FIG. 4 differs only from the machine shown in FIG. 1, in that the eccentric 7' has a fixed eccentricity. In other words the element 7' is a crank.

An alteration in the amplitude of the lifting blades 5 is obtained by means of a number of holes 20 in the middle part of the leg 2. The lower end of the link 6 is connected to the leg 2 through one of the holes 20 with a bolt 21. It will easily be understood that by using a hole further away from the extremity 3, the amplitude of the blade 5 diminishes. The holes 20 lie on an arc with a radius of curvature substantially equal to the length of the link 6.

In order to ensure an undisturbed operation of the driving mechanism and absence of vibration in the tractor or in the frame 1, it is desired to mount a flywheel 22 on the driving shaft 8. If desired the eccentric 7 can be arranged on either side of the flywheel and secured thereto.

A beet conveyor or the like can be connected to the frame 1 at a suitable location thereof.

With regard to the adaptation of the stroke length of the lifting blades 5 to the prevailing circumstances, it should be noted that in the event of dry hard ground the stroke length should be very short in order to prevent the beets from braking and notwithstanding to enable the beets to be lifted from the ground without taking along earth. In the event of wet ground, the stroke length of the lifting blades should, on the contrary, be great and possibly different for two juxtaposed lifting blades in order to produce a certain rotary movement of the beets on lifting them for the purpose of removing earth adhering thereto. In the event of strongly branched beets in wet ground, the stroke length of two adjacent lifting blades should be substantially alike.

The frequency of the movement of the lifting blades should be greater in dry, hard ground than in wet ground. The amplitude on the contrary should be smaller for that very reason. All this can be obtained with the machine according to the invention by working at a higher number of revolutions of the driving mechanism (in order to impart an intensive motion to the beets without causing breakage), the beets being harvested in a sufficiently clean condition. The lifting blades reciprocating fast make the hard ground crumble and the beet disengage from the ground due to vibration, so that it rises in a clean condition.

In the machine according to the invention the moving blades cooperate with the beets while these are still undisturbed in the unbroken ground. The contact between the blades and the beets results in a slight turning movement of each beet, so that any adhering soil particles are eliminated and a clean as well as an undamaged beet becomes available.

While preferred embodiments of the invention have been shown and described, it is to be understood that changes and variations may be made without departing from the spirit and scope of the invention as defined in the appended claims.

What I claim is:

1. A machine for lifting tuberous plants from the ground, said machine comprising a frame including means for driving connection with the power take-off shaft of a carrying vehicle, a lifting device on said frame coupled with said means for being driven thereby, said lifting device including two legs each having one end pivotally connected to said frame and a lifting blade fixed to the other end, said lifting blade being free at its leading and trailing ends and a driving mechanism coupled to said means and to said legs to reciprocate the lifting blades with respect to the ground under the drive of said take-off shaft, said driving mechanism including respective means coupling the driving mechanism with each leg to provide a pre-determined amplitude of phase difference between the lifting blades, and means for adjusting the coupling means to modify the magnitude of said amplitude.

2. A machine as claimed in claim 1 wherein said means coupling the driving mechanism with each leg comprises an eccentric, and a link coupled to said eccentric and the associated leg.

3. A machine as claimed in claim 2 wherein said eccentric is adjustable and said means for adjusting the coupling means comprising means for adjusting the eccentric to vary the reciprocal stroke of the blade.

References Cited

UNITED STATES PATENTS

| 1,411,966 | 4/1922 | Gittins | 171—99 |
| 2,459,471 | 1/1949 | Tebbetts | 171—99 |

FOREIGN PATENTS 58,425  3/1913  Austria.

ANTONIO F. GUIDA, Primary Examiner